United States Patent
Tsugehara et al.

(12) 
(10) Patent No.: US 11,691,075 B2
(45) Date of Patent: Jul. 4, 2023

(54) DATA GENERATION DEVICE AND APPLICATION EXECUTION DEVICE

(71) Applicant: DWANGO Co., Ltd., Tokyo (JP)

(72) Inventors: Toyokazu Tsugehara, Tokyo (JP); Takuya Nishiyama, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 16/497,104

(22) PCT Filed: May 24, 2018

(86) PCT No.: PCT/JP2018/019952
§ 371 (c)(1),
(2) Date: Sep. 24, 2019

(87) PCT Pub. No.: WO2018/216759
PCT Pub. Date: Nov. 29, 2018

(65) Prior Publication Data
US 2020/0406133 A1 Dec. 31, 2020

(30) Foreign Application Priority Data
May 26, 2017 (JP) ................. 2017-104701

(51) Int. Cl.
*A63F 9/24* (2006.01)
*A63F 13/355* (2014.01)
(Continued)

(52) U.S. Cl.
CPC .......... *A63F 13/355* (2014.09); *A63F 13/352* (2014.09); *G06F 7/58* (2013.01)

(58) Field of Classification Search
CPC ......... A63F 13/35; A63F 13/352; A63F 13/87
See application file for complete search history.

(56) References Cited

U.S. PATENT DOCUMENTS

| 2006/0135264 A1* | 6/2006 | Shaw | A63F 13/795 463/42 |
| 2009/0203449 A1* | 8/2009 | Douceur | A63F 13/358 463/42 |

(Continued)

FOREIGN PATENT DOCUMENTS

| JP | 2000299684 A | 10/2000 |
| JP | 2007-206755 A | 8/2007 |

(Continued)

OTHER PUBLICATIONS

Translation of International Search Report and Written Opinion dated Jun. 19, 2018 in corresponding application No. PCT/JP2018/019952; 10 pgs.

(Continued)

*Primary Examiner* — David L Lewis
*Assistant Examiner* — Eric M Thomas
(74) *Attorney, Agent, or Firm* — Maier & Maier, PLLC

(57) ABSTRACT

A data processing device according to an aspect of the present invention includes a reception unit, a generation unit, and a transmission unit. The reception unit receives operation requests with respect to an application from an arbitrary number of application execution devices executing the application. The generation unit generates application operation data that includes operation input data for the application and time data indicating the time when the relevant operation input data is applied to the application. The transmission unit transmits the application operation data to the arbitrary number of application execution devices. When an operation request is received from one or more of the arbitrary number of application execution devices, the generation unit generates operation input data on the basis of the relevant operation request.

10 Claims, 5 Drawing Sheets

(51) Int. Cl.
     *A63F 13/352*    (2014.01)
     *G06F 7/58*       (2006.01)

(56) References Cited

U.S. PATENT DOCUMENTS

2009/0325712 A1* 12/2009 Rance .................. A63F 13/795
                                                           463/42
2019/0091572 A1*  3/2019 Stafford ................ A63F 13/335

FOREIGN PATENT DOCUMENTS

| JP | 2010022494 A | 2/2010 |
| --- | --- | --- |
| JP | 2011-508290 A | 3/2011 |
| JP | 2013158545 A | 8/2013 |
| JP | 2015153101 A | 8/2015 |
| JP | 2016185348 A | 10/2016 |
| JP | 6098739 B | 3/2017 |
| WO | 2015163208 A1 | 10/2015 |

OTHER PUBLICATIONS

Decision of Refusal dated Nov. 14, 2017 in corresponding application No. JP2017-104701; 11 pgs.
Decision to Grant a Patent dated Mar. 6, 2018 in corresponding application No. JP2017-104701; 5 pgs.

* cited by examiner

DATA GENERATION DEVICE AND APPLICATION EXECUTION DEVICE

FIELD

The present invention relates to a technology of providing content experience to a user.

BACKGROUND

In JP-A-2016-185348, it is described that in a massively multiplayer online role-playing game (MMORPG), a server repeats a set of processings such as (1) receiving operation instruction information from a game device, (2) storing the operation instruction information in an HDD, (3) transmitting information relevant to a progress status of the game to the game device, and (4) storing evaluation information, the operation instruction information, and the information relevant to the progress status of the game, as playlog, for each one frame. In addition, it is also described that the operation instruction information, the information relevant to the progress status of the game, or the like that is necessary for the game device and the server to advance the game in synchronization, is subjected to transmission and reception in real time.

In JP-A-2015-153101, it is described that replay data indicating which key a user presses at which timing, for each unit time (for example, for each one frame of a game screen) is used in order to reproduce an execution procedure of a mini game and a stage. In addition, it is also described that in a case where the user performs a predetermined operation while reproducing the replay data, the reproduction of the replay data is stopped, and after that, the game is executed on the basis of the operation of the user.

SUMMARY OF THE INVENTION

The playlog described in JP-A-2016-185348 is basically accumulated to extract cheating, or to be utilized for correcting the contents of a network game or for developing a new game.

According to the replay data that is described in JP-A-2015-153101, new game experience can be derived from the past game experience. However, such new game experience is premised on single play, and for example, only a user is capable of participating in a game that is derived from the user.

An object of the invention is to provide content experience in which a user is capable of actively participating, and the number of users is scalable.

According to one aspect of the invention, a data generation device includes a reception unit, a generation unit, and a transmission unit. The reception unit receives an operation request with respect to an application from an arbitrary number of application execution devices executing the application. The generation unit generates application operation data including operation input data with respect to the application and time data indicating a time for applying the operation input data to the application. The transmission unit transmits the application operation data to the arbitrary number of application execution devices. In a case where the operation request is received from at least one of the arbitrary number of application execution devices, the generation unit generates the operation input data on the basis of the operation request.

According to another aspect of the invention, an application execution device includes an execution unit, a generation unit, a transmission unit, and a reception unit. The execution unit executes an application. The generation unit generates an operation request with respect to the application, on the basis of user input. The transmission unit transmits the operation request to a data generation device. The reception unit receives application operation data including operation input data with respect to the application and time data for applying the operation input data to the application, from the data generation device. The execution unit applies the operation input data to the application at the time indicated by the time data corresponding to the operation input data.

According to the invention, it is possible to provide content experience in which a user is capable of actively participating, and the number of users is scalable.

BRIEF DESCRIPTION OF THE DRAWINGS

FIG. 7 is an explanatory diagram of an application for a puzzle game that is executed by the application execution device of FIG. 3.

FIG. 8 is an explanatory diagram of an application for a questionnaire that is executed by the application execution device of FIG. 3.

FIG. 9 is an explanatory diagram of a timing when transmission and reception of data relevant to the execution of the application (excluding an operation request and application operation data) are performed by the application execution device of FIG. 3.

DETAILED DESCRIPTION

Figure 1:
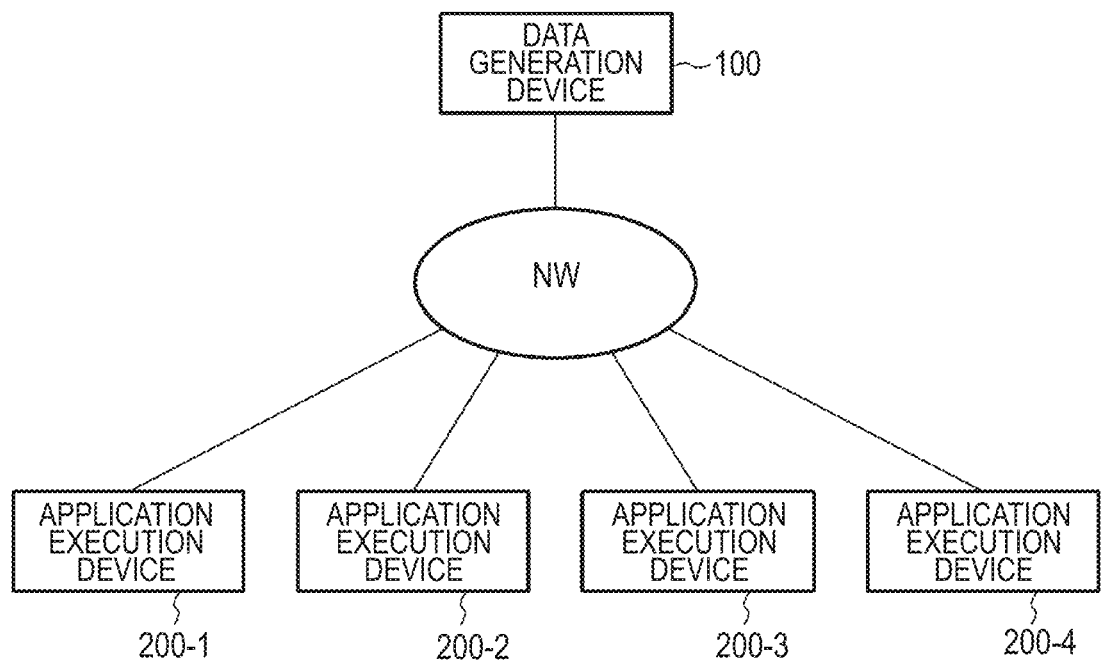
FIG. 1 is a block diagram illustrating a network configuration of a content experience providing system according to a first embodiment.

Hereinafter, an embodiment will be described with reference to the drawings. Furthermore, hereinafter, the same or similar reference numerals will be applied to the same or similar elements that have been described, and the repeated description will be basically omitted. For example, in a case where there are a plurality of same or similar elements, there is a case where common reference numerals may be used in order to describe the respective elements without any distinction described, and there is also a case where branch numbers may be used in addition to the common numbers in order to distinctively describe the respective elements.

First Embodiment

As illustrated in FIG. 1, a content experience providing system according to a first embodiment includes a data generation device 100, and application execution devices 200-1, 200-2, 200-3, and 200-4. The data generation device 100 and the application execution device 200 are connected to each other through a network, and thus, are capable of transmitting and receiving data to each other. Furthermore, it is not essential that the application execution devices 200 are connected to each other. It is sufficient that at least each of the application execution devices 200 and the data generation device 100 are connected to each other. The total number of application execution devices 200 is not limited to 4, and may be 1 to 3, or may be greater than or equal to 5. In addition, a Web server (not illustrated) may be connected through a network.

The content experience providing system of FIG. 1 is capable of providing a user of an arbitrary number of application execution devices 200 executing the same application with content experience of the application.

Specifically, the data generation device 100 generates application operation data, and distributes (transmits) the application operation data to the application execution device 200. Then, the application execution device 200 applies the application operation data to the application.

The application is capable of generating contents as at least a part of an execution result. The contents, for example, are a moving image, a still image, a sound, a text, and the like. The application, for example, can be a video game, a questionnaire, a quiz, drawing software, and the like.

In a case where the application execution device 200 applies the same application operation data to the same application at approximately the same timing (it is desirable to be synchronized, but it is not essential to be synchronized), the user of the application execution device 200 is capable of approximately simultaneously experiencing the contents.

Further, the user of the application execution device 200 is also capable of actively participating in the decompression of the contents. Specifically, the application execution device 200 generates an operation request with respect to the application, in accordance with the input of the user. The application execution device 200 transmits the operation request to the data generation device 100. Then, in a case where the operation request is received from at least one application execution device 200, the data generation device 100 generates (operation input data included in) the application operation data, on the basis of the operation request. That is, operation input of each user can be reflected on the decompression of the contents that all of the users experience.

Furthermore, the data generation device 100 may function as the application execution device 200. That is, the data generation device 100 may generate the application operation data, may distribute the application operation data to the application execution device 200, and may apply the application operation data to the application.

Figure 6:
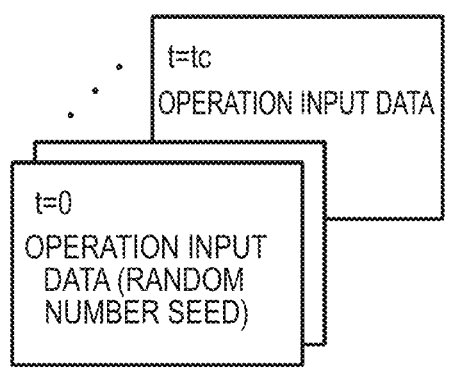
FIG. 6 is a diagram illustrating the structure of application operation data that is generated by the data generation device of FIG. 2.

The application execution device 200 receives the application operation data from the data generation device 100 through a network. Here, as illustrated in FIG. 6, the application operation data includes at least a data set of the operation input data with respect to the application, and time data indicating a time for applying the operation input data to the application. More specifically, the application operation data includes all of the operation input data items to be applied to the application, and the time data indicating the time for applying the operating input data, from an execution start of the application (an initial state).

The application operation data, for example, may include additional data such as a random number seed, in a manner that depends on the type of application. It is sufficient that the additional data is data that is useful to increase reproducibility of the execution result of the application. The reproducibility of the execution result of the application, for example, can be evaluated in accordance with how an execution result in a case where the application operation data is used at a certain time point is identical to an execution result in a case where the application operation data is used in the future, or how an execution result in a case where a certain application execution device uses the application operation data is identical to an execution result in a case where another application execution device uses the application operation data.

The application execution device 200 applies the operation input data included in the application operation data to the application at the time indicated by the time data corresponding to the operation input data. In a case where all of the application execution devices 200 are approximately simultaneously operated, all of the users are capable of approximately simultaneously enjoying the same execution result, that is, the same contents (for example, a play video of a video game).

Typically, the application execution device 200 is a television set (including an internet television), a personal computer (PC), a mobile terminal (for example, a tablet, a smart phone, a laptop, a feature phone, a portable game machine, a digital music player, an electronic book reader, and the like), a virtual reality (VR) terminal, and an augmented reality (AR) terminal, but is not limited thereto.

The application execution device 200 includes a processor that performs the execution of the application, the generation of the operation request, communication control, and the like, and a memory that temporarily stores a program to be executed by the processor in order to realize such processing, data to be used by the processor, and the like.

Further, in the application execution device 200, a communication device for network connection, an output device for outputting the contents, an input unit for receiving the user input, and an auxiliary storage device for capturing a program or data can be used. The communication device, the output device, the input device, and the auxiliary storage device may be built in the application execution device 200, or may be externally attached to the application execution device 200.

The communication device communicates with the data generation device 100 or the Web server (not illustrated) through a network. For example, the communication device receives the application operation data from the data generation device 100, transmits the operation request to the data generation device 100, receives data relevant to the execution of the application (a specific example will be described below) from the Web server, or transmits the data relevant to the execution of the application to the Web server. Furthermore, the data relevant to the execution of the application may be exchanged with the data generation device 100 but not the Web server.

The output device is capable of including a display device for displaying a moving image, a still image, a text, and the like and/or a speaker for outputting a sound, a music, and the like. The display device, for example, is a liquid crystal display, an organic electroluminescence (EL) display, a cathode ray tube (CRT) display, and the like. The display device displays display data including the contents. Furthermore, the display device may have a function of an input device, as with a touch screen.

The input device, for example, may be a keyboard, a mouse, a numeric keypad, and the like, and may have a function of a display device, as with the touch screen. For example, the input device receives input for an operation from the user, with respect to the application during the execution, by using the application operation data that is distributed from the data generation device 100. However, it is not necessary that the input devices of all of the application execution devices 200 receive the input for an operation with respect to the application. That is, some application execution devices 200 are capable of sharing the content experience by applying the received application operation data to the application, but are not capable of actively participating in the decompression of the contents by generating the operation request.

Typically, the user input can be tapping, clicking, pressing a specific key, and the like. In addition, the user input, for example, is capable of including the action of the user (for example, swinging the application execution device 200) that is assumed on the basis of a sound that is captured by a microphone, biological data that is detected by a biological sensor (for example, a body temperature, an expression, and the like), position data that is identified by a global positioning system (GPS) or base station information, acceleration data that is detected by an acceleration sensor, and the like.

The auxiliary storage device, for example, stores a program or data relevant to the application. It is preferable that the auxiliary storage device, for example, is a non-volatile storage medium such as a hard disk drive (HDD) and a solid state drive (SSD). However, the entire processing can also be performed on a main storage device without using the auxiliary storage device. The auxiliary storage device can be a file server that is connected to the application execution device 200 through a network.

Figure 3:
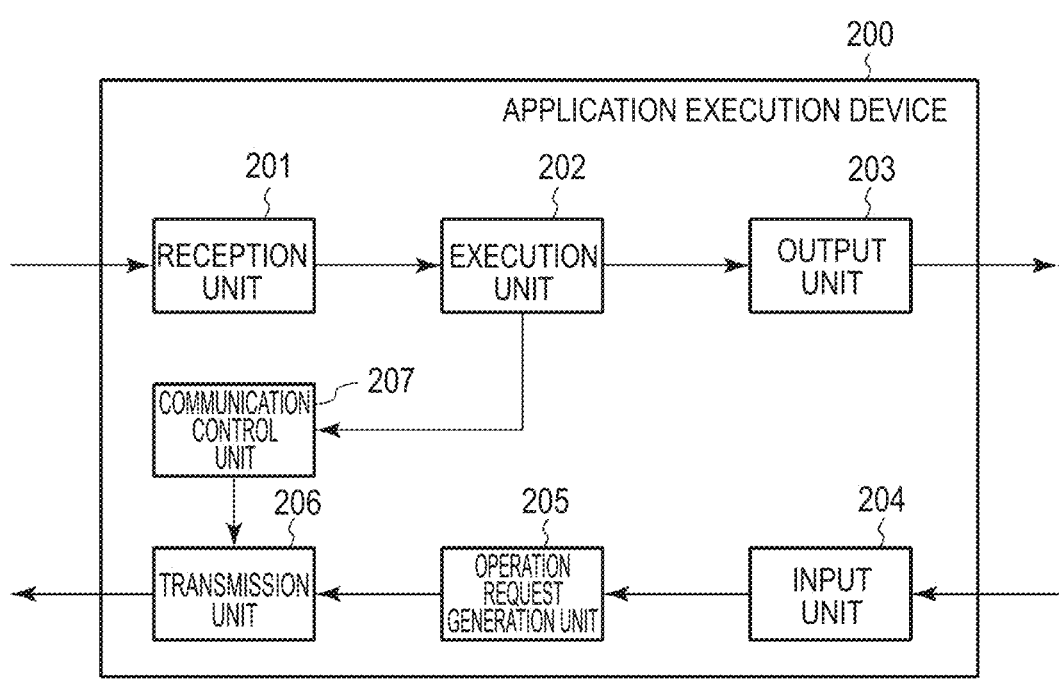
FIG. 3 is a block diagram illustrating an application execution device of FIG. 1.

Hereinafter, the details of the application execution device 200 will be described by using FIG. 3. The application execution device 200 includes a reception unit 201, an execution unit 202, an output unit 203, an input unit 204, an operation request generation unit 205, a transmission unit 206, and a communication control unit 207.

The reception unit 201 receives the application operation data from the data generation device 100 through a network. The reception unit 201 sends the application operation data to the execution unit 202. In addition, the reception unit 201, for example, may receive the data relevant to the execution of the application, such as resource data, from the Web server (not illustrated), through a network. Even in such a case, the reception unit 201 sends the received data to the execution unit 202. The reception unit 201 may be the communication device described above, or may be an interface with respect to the communication device.

As described above, the application operation data includes at least the data set of the operation input data with respect to the application and the time data indicating the time for applying the operation input data to the application, and is capable of further including the additional data such as the random number seed.

Here, in a case where the application operation data, for example, is generated for each unit time, the time data can be a value in which an elapsed time based on a predetermined timing (for example, the execution start of the application) is quantized by the unit time. Specifically, in a case where the contents include a moving image, a frame interval can be regarded as the unit time. In this example, the time data may indicate the number of frames to which the corresponding operation input data is applied.

The execution unit 202 executes the application. Specifically, the execution unit 202 receives the application operation data from the reception unit 201, and applies the operation input data included in the application operation data to the application at the time indicated by the time data corresponding to the operation input data. The application generates an execution result according to the applied operation input data. The execution unit 202 sends contents included in the execution result (for example, a moving image) to the output unit 203. The execution unit 202 can be the processor and the memory described above.

The output unit 203 receives the contents from the execution unit 202, and outputs the contents. For example, the output unit 203 displays a moving image, a still image, or a text, or outputs a sound or a music. The output unit 203 may be the output device described above, or may be the interface with respect to the output device.

The input unit 204 receives the user input. The input unit 204 sends the user input to the operation request generation unit 205. Specifically, the application can be actively operated by the user input. For example, in a case where the application is a video game, the user input is capable of indicating an operation such as selection, movement, an action, and a state change of an object in the game (for example, a character, an item, a background, and the like). The input unit 204 may be the input device described above, or may be the interface with respect to the input device.

The operation request generation unit 205 receives the user input from the input unit 204. The operation request generation unit 205 generates the operation request on the basis of the user input. The operation request generation unit 205 sends the operation request to the transmission unit 206. The data generation device 100 receiving the operation request is stimulated to generate the operation input data for applying an operation intended by the user to the application. The operation request generation unit 205 can be the processor and the memory described above.

The transmission unit 206 receives the operation request from the operation request generation unit 205. The transmission unit 206 transmits the operation request to the data generation device 100 through a network. In addition, the transmission unit 206, for example, may receive the data relevant to the execution of the application, such as the play data, from the execution unit 202, and may transmit the data, for example, the data relevant to the execution of the application, such as the play data, to the Web server (not illustrated), through a network. In addition, the transmission unit 206 may transmit a distribution request of the application operation data in order to stimulate the distribution of the application operation data with respect to the data generation device 100. The distribution of the application operation data with respect to the application execution device 200 that is an operation source of the distribution request may be started, triggered by the distribution request. The transmission unit 206 may be the communication device described above, or may be the interface with respect to the communication device.

However, the reception unit 201 or the transmission unit 206 is capable of receiving or transmitting data that does not correspond to both of the operation request and the application operation data but is relevant to the execution of the application. Specifically, in a case where the application is a video game, a part or all of resource data such as image data necessary for generating a game screen, sound data for a background music (BGM), and voice data for a sound of a character, and/or program data of the application are not locally captured on the application execution device 200, but may be necessary to be downloaded from the Web server. Alternatively, play data of a player character, such as a level, a score, and a clear time, may be necessary to be uploaded to the Web server.

However, how the communication processing is processed depends on a user environment (for example, processing capacity, a communication rate, and the like of the application execution device 200). For this reason, in a case where the communication processing is freely performed during the execution of the application, an application timing of the application operation data is slightly behind the schedule, and there is a concern that the same application operation data is applied to each of the applications under an application execution state in which a plurality of application execution devices 200 are different from each other. Accordingly, the application execution state in the application execution devices 200 transitions to a completely different application execution state, and thus, there is a concern that the subsequent share of the content experience is broken.

Figures 7, 8, 9:
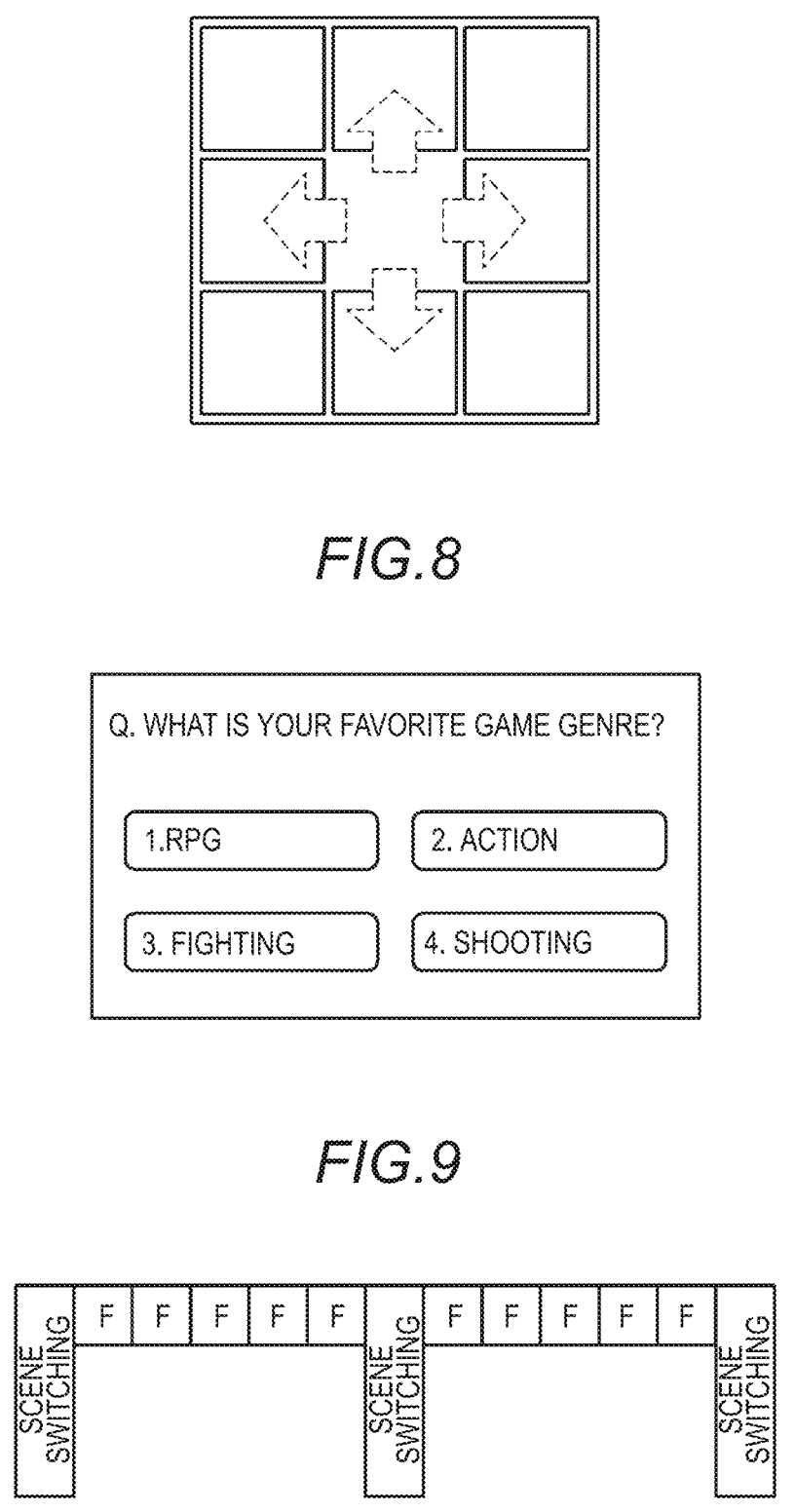

Therefore, as illustrated in FIG. 9, the share of the content experience may be prevented from being broken by using a scene switching time between frames (F) configuring each scene. Specifically, the reception unit 201 and the transmission unit 206 transmit and receive the data relevant to the execution of the application excluding the operation request and the application operation data, within the scene switching time. Accordingly, an application execution state when each of the application execution devices 200 applies the application operation data is not affected by the transmission and reception of the data, and thus, it is possible to prevent the share of the content experience from being broken.

In addition, there can also be a large difference in the application execution state between different application execution devices 200. As a result thereof, an application execution state in the application execution device 200 of a certain user is delayed compared to the other application execution device 200, and thus, there is a concern that the user makes a wrong operation request.

Therefore, in a case where it is considered that the application execution device 200 is not capable of applying the operation input data included in the application operation data to the application at the time indicated by the time data corresponding to the operation input data, the delay may be partially or completely eliminated by continuously applying the operation input data within a time shorter than a unit time of the time data, as possible.

The communication control unit 207 controls the communication with respect to the Web server from the application execution device 200 (for example, the transmission of the play data). Specifically, in a case where the start of the scene switching is notified from the execution unit 202, the communication control unit 207 allows the transmission unit 206 to transmit the data to the Web server. As a result thereof, the transmission unit 206 is capable of transmitting the data to the Web server to the scene switching time.

Furthermore, there can also be the same communication control unit in the Web server (not illustrated). The communication control unit controls the communication with respect to the application execution device 200 from the Web server (for example, the transmission of the resource data). Specifically, in a case where the start of the scene switching is sensed by any means, the communication control unit allows the transmission unit of the Web server to transmit the data to the application execution device 200. As a result thereof, the reception unit 201 of the application execution device 200 is capable of receiving the data from the Web server within the scene switching time.

Figure 5:
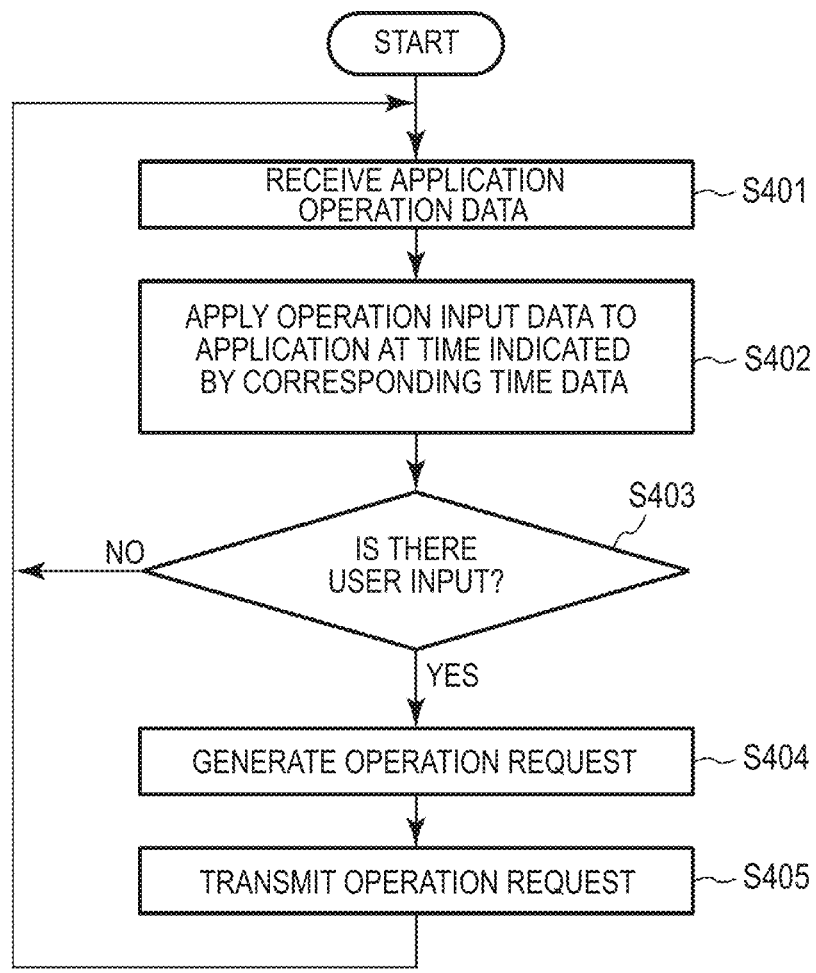
FIG. 5 is a flowchart illustrating the operation of the application execution device of FIG. 3.

Hereinafter, an operation example of the application execution device 200 will be described by using FIG. 5.

The reception unit 201 receives the application operation data from the data generation device 100 through a network (Step S401). Furthermore, in order to realize an active operation of the user with respect to the application, it is necessary to generate the application operation data and to provide the content experience using the application operation data in parallel. In this case, the application operation data is transmitted every time when the data set of the time data and the operation input data is generated. On the other hand, in a case where the content experience using the application operation data is provided after the generation of a set of application operation data items is ended, the set of application operation data items may be collectively transmitted.

The execution unit 202 applies the operation input data corresponding to the time data to the application at the time indicated by the time data, with reference to the time data included in the application operation data that is received in Step S401 (Step S402). The output unit 203 outputs the contents included in the execution result.

In a case where the input unit 204 receives the user input (Step S403), the operation request generation unit 205 generates the operation request on the basis of the user input (Step S404). The transmission unit 206 transmits the operation request that is generated in Step S404 to the data generation device 100 (Step S405).

The data generation device 100 may be a server, or may be any one of various devices exemplified as an example of the application execution device 200.

The data generation device 100 includes a processor that performs the generation of the application operation data, the communication control, and the like, and a memory that stores a program to be executed by a processor in order to realize such processing, data to be used by the processor, and the like.

Further, in the data generation device 100, a communication device for network connection, and an auxiliary storage device for accumulating large volumes of data can be used. The communication device and the auxiliary storage device may be built in the data generation device 100, or may be externally attached to the data generation device 100.

The communication device communicates with the application execution device 200 through a network. For example, the communication device distributes the application operation data to the application execution device 200, and receives the operation request with respect to the application from the application execution device 200.

The auxiliary storage device, for example, accumulates the application operation data that is generated by the data generation device 100. It is preferable that the auxiliary storage device, for example, is a non-volatile storage medium such as an HDD and an SSD. The auxiliary storage device can be a file server that is connected to the data generation device 100 through a network.

Figure 2:
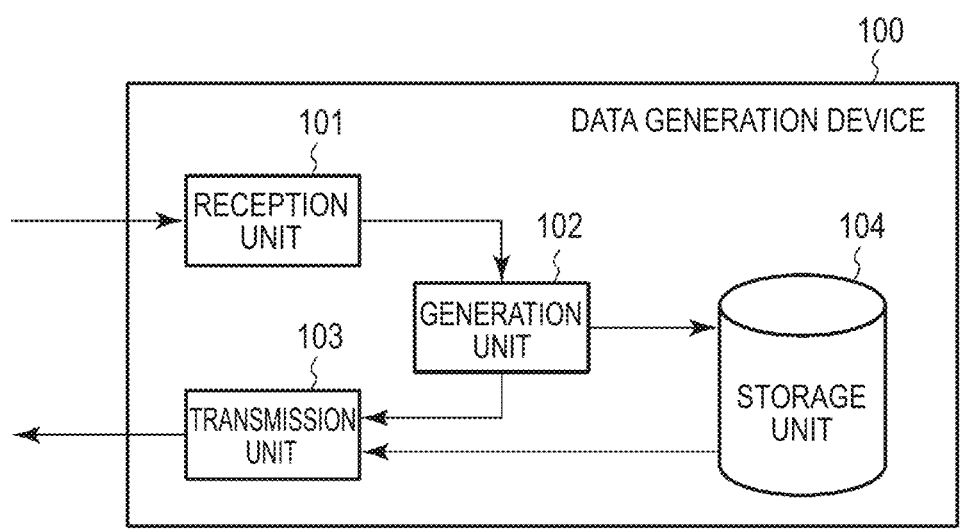
FIG. 2 is a block diagram illustrating a data generation device of FIG. 1.

Hereinafter, the details of the data generation device 100 will be described by using FIG. 2. The data generation device 100 includes a reception unit 101, a generation unit 102, a storage unit 104, and a transmission unit 103.

The reception unit 101 receives the operation request from the application execution device 200 through a network. The reception unit 201 sends the operation request to the generation unit 102. The reception unit 101 may be the communication device described above, or may be the interface with respect to the communication device.

In a case where the operation request is received from the reception unit 101, the generation unit 102 generates the application operation data on the basis of the operation request. The generation unit 102 captures the application operation data on the storage unit 104, and sends the application operation data to the transmission unit 103 to be distributed to the application execution device 200. The generation unit 102 can be the processor and the memory described above.

Specifically, the operation request can be reflected on the operation input data in the application operation data. In addition, the time data corresponding to the operation input data, for example, is set in a manner that depends on a reception timing of the operation request.

Regarding a certain type of application (for example, a video game), the generation unit 102 may necessarily generate the application operation data for each unit time. That is, even in a case where the generation unit 102 does not receive the operation request at all with respect to a certain frame, the application operation data may be generated by associating empty operation input data with the time data indicating the frame.

On the other hand, regarding another type of application (for example, a questionnaire), the generation unit 102 may generate the application operation data for each application execution state. As an example, in a certain type of moving image distribute service, a poster of a moving image or an operator of a service is capable of performing a questionnaire with respect to the user viewing the moving image as illustrated in FIG. 8. In an application for a questionnaire, in a case where the contents of the questionnaire are set by the poster or the operator, the reception of a reply is started from the user, the reply is closed after a certain period of time, and an aggregation result is released. In this case, the operation input data for displaying the contents of the questionnaire set by the poster or the operator may be generated in association with the start of the reception of the reply from the user, the operation input data for aggregating the reply of the user that has been received so far may be generated in association with the close of the reply, or the operation input data for displaying the aggregation result may be generated in association with the release of the aggregation result.

In a case where the plurality of application execution devices 200 approximately simultaneously transmit the operation request, there can be a collision between the operation requests. That is, there is a case where the operation request from a certain application execution device 200 is in conflict with the operation request from the other application execution device 200. For example, the operation request from a certain application execution device 200 may require a character to be moved to the right, and the operation request from another application execution device 200 may require the character to be moved to the left. The generation unit 102 is capable of handling such a collision as described below. Furthermore, such a collision may be adjusted at the level of the operation request, as described below, or may be adjusted at the level of the application operation data after the application operation data is generated once on the basis of each of the operation requests. In the latter case, each of the application execution devices 200 but not the data generation device 100 performs the adjustment. In addition, in any case, the implementation of the adjustment depends on the application.

In order to adjust the collision, priority may be assigned to each of the operation requests. The priority, for example, may be set in advance for each of the users. That is, the operation request of a certain user may be easily reflected on the operation input data, and the operation request of the other user may be hardly reflected on the operation input data.

For example, a use case is assumed in which a certain user (a caster) shows the other user (an audience) a video of a game that is played in real time, by using the content experience providing system of FIG. 1. In this case, the priority of the operation request from the caster may be set to be high, and the priority of the operation request from the audience may be set to be low. As described above, in the case of designing the priority of the operation request, the caster performs a basic game operation, and the audience performs an auxiliary game operation for interference (may be a help, or may be a hindrance), and thus, it is possible to provide new game experience in which both of the caster and the audience are capable of participating in the decompression of the game.

In a case where the priority is assigned to the operation request, the generation unit 102 is capable of generating the operation input data on the basis of the operation request and the priority that is assigned to the operation request. For example, the generation unit 102 may reflect the operation request to which the highest priority is assigned on the operation input data, or may perform sortition such that a winning rate increases as the assigned priority is high, and may reflect the elected operation request on the operation input data.

Alternatively, in order to adjust the collision, the generation unit 102 may determine the operation request to be reflected on the operation input data by a majority method. That is, the generation unit 102 may reflect the most received operation request on the operation input data. Alternatively, the generation unit 102 may reflect an operation request having the highest sum of the corresponding priorities in the received operation requests on the operation input data by combining the priorities described above.

In FIG. 7, display data that is generated by an application for a puzzle game is illustrated. The puzzle game is a so-called sliding block puzzle aiming for the completion of the original picture by moving a block from right to left or up and down by using a blank of one block from a state where n×m−1 blocks into which one picture is divided are paved in an array different from that of the original picture, in a space of n×m blocks. In a case where the puzzle game is executed by using the content experience providing system of FIG. 1, for example, it is possible to determine which of peripheral blocks of the blank (adjacent blocks on upper and lower sides and right and left sides) is slid by the majority vote of the user.

In an application where a plurality of players enjoy the competition, such as a board game and a card game, the users may be grouped, and each group may be capable of operating one of the players. In this case, an observing point may be different for each group, and the state (for example, a physical strength, a deal, and the like) of players of other groups may not be known.

Alternatively, for example, as with multiplay of the video game, an operable target may be completely different for each user. Here, the target indicates an object or the like that is handled by an application. In this case, a collision does not occur between the operation requests.

The transmission unit 103 receives the application operation data from the generation unit 102. The transmission unit 103 transmits the application operation data to the application execution device 200 through a network. Alternatively, the transmission unit 103 may read out the application operation data that is accumulated in the storage unit 104, and may transmit the application operation data to the application execution device 200 through a network. The transmission unit 103 may be the communication device described above, or may be the interface with respect to the communication device.

The storage unit 104 stores the application operation data that is generated by the generation unit 102. As described above, the application operation data includes time data indicating a time for applying all of the operation input data items to the application from the execution start of the application (the initial state). For this reason, in a case where the application operation data is captured, it is possible to reproduce the same content at an arbitrary time point in the future. The storage unit 104 may be the auxiliary storage device described above, or may be an interface with respect to the auxiliary storage device.

Figure 4:
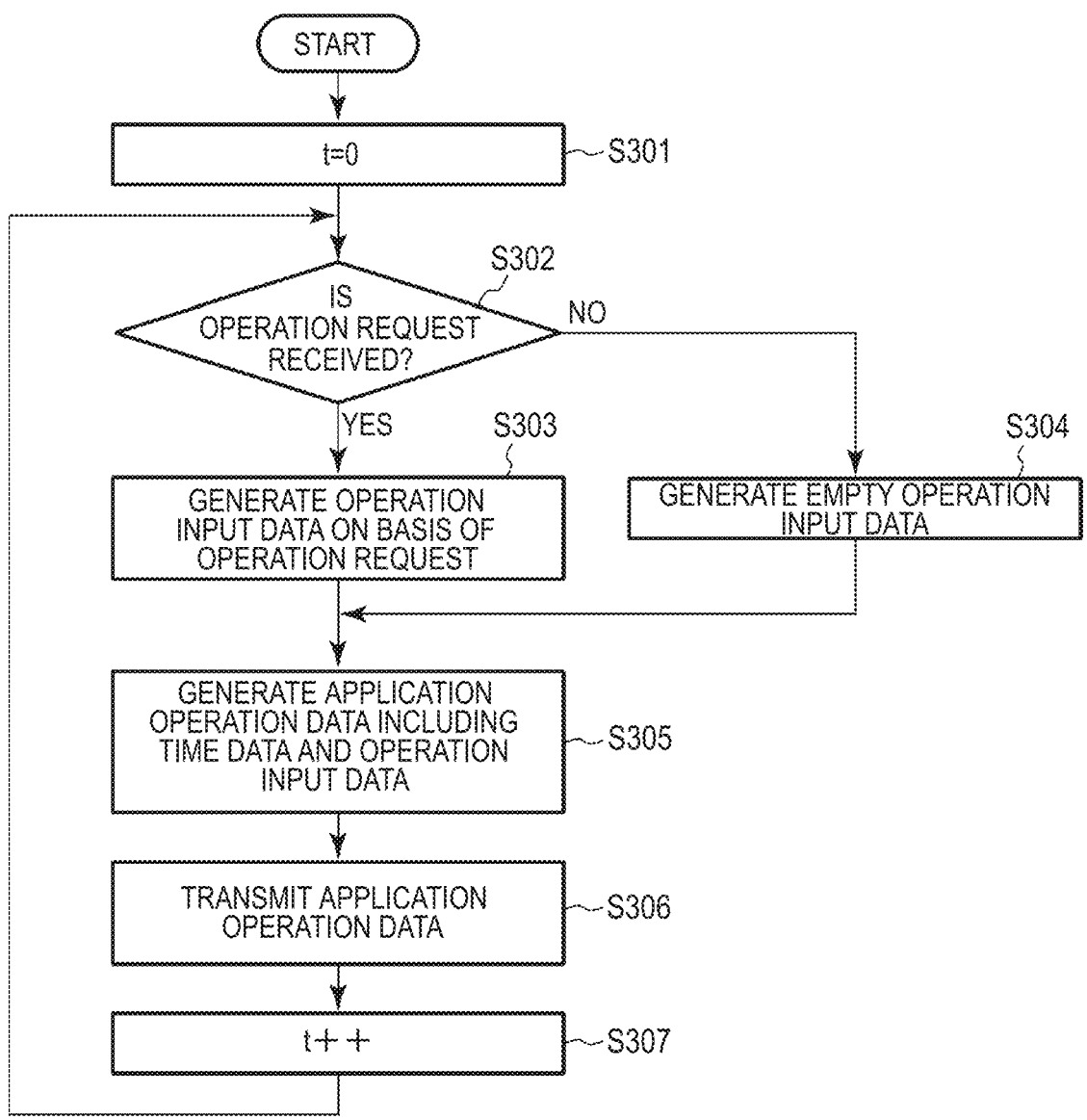
FIG. 4 is a flowchart illustrating the operation of the data generation device of FIG. 2.

Hereinafter, an operation example of the data generation device 100 will be described by using FIG. 4.

First, the generation unit 102 initializes a variable t indicating time (for example, the number of frames) (Step S301). In a case where the reception unit 101 receives the operation request for generating operation input data corresponding to t from any one of the application execution devices 200, the processing proceeds to Step S303, and in a case where the reception unit 101 does not receive the operation request for generating the operation input data from any of the application execution devices 200, the processing proceeds to Step S304 (Step S302). Furthermore, Step S302 may be determined on the basis of a reception result of the reception unit 101 at an actual time (for example, a frame interval) corresponding to an increment of tin Step S307 described below.

In Step S303, the generation unit 102 generates the operation input data corresponding to t, on the basis of the received operation request, and the processing proceeds to Step S305. In a case where a collision does not occur between the operation requests, the generation unit 102 may reflect the operation request on the operation input data as it is. In a case where a collision occurs between the operation requests, the generation unit 102 may generate the operation input data by using the priority, the majority method, and the like described above. Furthermore, the collision may be adjusted at the level of the application operation data. In this case, the generation unit 102 does not perform the adjustment.

On the other hand, in Step S304, the generation unit 102 generates the empty operation input data, and the processing proceeds to Step S305. As described above, in a case where the empty operation input data is generated, it is possible to guarantee that there are all of the operation input data items corresponding to t. However, Step S304 can be omitted in a manner that depends on the specification of the application. In this case, the transition to Step S304 from Step S302 may be substituted with a transition to Step S307 from Step S302.

In Step S305, the generation unit 102 generates the application operation data including time data indicating a current value of t, and the operation input data that is generated in Step S303 or Step S304. Furthermore, before Step S305, a step of processing (converting, reducing, or generating) the operation input data may be inserted. In such a step, for example, in a case where the number of operation requests excessively increases, the operation input data may be reduced in accordance with the priority assigned to the operation request.

The transmission unit 103 transmits the application operation data that is generated in Step S305 to the application execution device 200 (Step S306). The application operation data can be separately captured on the storage unit 104. Finally, the generation unit 102 increases t by 1, and the processing returns to Step S302.

As described above, the content experience providing system according to the first embodiment distributes the application operation data including the operation input data with respect to the application, and the time data indicating the time for applying the operation input data to the application to the arbitrary number (one or more) of application execution devices. Each of the application execution devices applies the operation input data included in the application operation data to the application at the time indicated by the time data corresponding to the operation input data. For this reason, according to such a content experience providing system, all of the users are capable of experiencing the same contents regardless of the number of users. That is, the number of users is scalable.

In addition, the application execution device generates the operation request with respect to the application, on the basis of the user input, and transmits the operation request to the data generation device. The data generation device generates the operation input data, on the basis of the operation request. For this reason, according to such a content experience providing system, the user is capable of actively participating in the decompression of the contents.

The embodiment described above merely represents a specific example for assisting the understanding of the gist of the invention, and is not intended to limit the scope of the invention. In the embodiment, various constituents can be added, deleted, or converted within a range not departing from the gist of the invention.

Various functional units described in each of the embodiments described above may be realized by using a circuit. The circuit may be a dedicated circuit realizing a specific function, or may be a general-purpose circuit such as a processor.

At least a part of the processing of each of the embodiments described above can also be realized by using a general-purpose computer as basic hardware. A program for realizing the processing may be provided by being stored in a recording medium that is readable by a computer. The program is stored in the recording medium as a file in an installable format or executable format. Examples of the recording medium include a magnetic disk, an optical disk (a CD-ROM, a CD-R, a DVD, or the like), a magnetooptical disk (an MO or the like), a semiconductor memory, and the like. The recording medium may be any recording medium insofar as the recording medium is capable of storing a program and is capable of being read by a computer. In addition, the program for realizing the processing may be stored on a computer (a server) that is connected to a network such as the internet, and may be downloaded to a computer (a client) through the network.

The invention claimed is:

1. A data generation device, comprising:
a reception unit that receives an operation request with respect to an application from one or more of a plurality of application execution devices, each comprising a processor operated by a human user, simultaneously executing the application;
a generation unit that generates application operation data including operation input data with respect to the application and time data indicating a future time for applying the operation input data to the application; and
a transmission unit that transmits the application operation data to the plurality of application execution devices, including one or more application execution devices which did not provide the operation request; and
wherein in a case where the operation request is received from at least one of the plurality of application execution devices, the generation unit generates the application operation data on the basis of the operation request.

2. The data generation device according to claim 1, wherein a target that is configured to be operated by a first application execution device of the plurality of application execution devices is different from a target that is configured to be operated by a second application execution device of the plurality of application execution devices.

3. The data generation device according to claim 1, wherein a target that is configured to be operated by a first application execution device of the plurality of application execution devices is identical to a target that is configured to be operated by a second application execution device of the plurality of application execution devices.

4. The data generation device according to claim 1, wherein the application operation data further includes a random number seed.

5. An application execution device, comprising:
   an execution unit that executes an application on a processor;
   a generation unit that generates an operation request with respect to the application, on the basis of user input;
   a transmission unit that transmits the operation request to a data generation device; and
   a reception unit that receives application operation data including operation input data with respect to the application and time data indicating a future time for applying the operation input data to the application, from the data generation device, wherein the execution unit applies the operation input data to the application at the time indicated by the time data corresponding to the operation input data.

6. The application execution device according to claim 5, wherein an execution result of the application includes a moving image, and
   the transmission unit and the reception unit perform transmission and reception of data relevant to execution of the application, excluding the operation request and the application operation data, within a scene switching time between frames configuring each scene in the moving image included in the execution result of the application.

7. A non-transitory computer readable medium configured to perform the steps of:
   receiving an operation request with respect to an application from one or more of a plurality of application execution devices, each comprising a processor simultaneously executing the application;
   generating application operation data including operation input data with respect to the application and time data indicating a future time for applying the operation input data to the application; and
   transmitting the application operation data to the plurality of application execution devices, including one or more application execution devices which did not provide the operation request;
   wherein in a case where the operation request is received from at least one of the plurality of application execution devices, the means of generating the application operation data generates the operation input data on the basis of the operation request.

8. A non-transitory computer readable medium configured to perform the steps of:
   executing an application on a processor;
   generating an operation request with respect to the application, on the basis of user input;
   transmitting the operation request to a data generation device; and
   receiving application operation data including operation input data with respect to the application and time data indicating a future time for applying the operation input data to the application, from the data generation device,
   wherein the executing the application applies the operation input data to the application at the time indicated by the time data corresponding to the operation input data,
   priority is assigned to the operation request, and
   in a case where the operation request is received, the data generation device generates the application operation data on the basis of an operation request having the highest sum of priorities in the operation requests.

9. The data generation device of claim 1, further comprising:
   a storage unit configured to store the application operation data as applied to the application, wherein the storage unit is configured to reproduce an identical application comprising the stored application operation data.

10. The data generation device of claim 1, wherein the application is actively operated by a user sending the operation request using the application execution device associated with the user.

* * * * *